United States Patent
Brack et al.

(10) Patent No.: US 6,734,277 B2
(45) Date of Patent: May 11, 2004

(54) METHOD OF ENHANCING PIT REPLICATION IN OPTICAL DISKS

(75) Inventors: Hans-Peter Brack, Herrliberg (CH); John Morgan Whitney, Niskayuna, NY (US); Jan-Pleun Lens, Breda (NL); Christopher David Goewey, Pittsfield, MA (US); Irene Dris, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/141,678

(22) Filed: May 9, 2002

(65) Prior Publication Data

US 2003/0212241 A1 Nov. 13, 2003

(51) Int. Cl.[7] .............................................. C08G 64/00
(52) U.S. Cl. ...................... 528/196; 264/219; 264/330; 264/340; 359/109; 369/47; 369/59.11; 369/59.24; 428/64; 528/198
(58) Field of Search ................................. 264/219, 330, 264/340; 359/109; 369/47, 59.11, 59.24; 428/64; 528/196, 198

(56) References Cited

U.S. PATENT DOCUMENTS 6,022,942 A * 2/2000 Ishiwa et al. ............... 528/196
6,436,503 B1 * 8/2002 Cradic et al. ............... 428/64.1
2003/0060575 A1 * 3/2003 Caruso et al.

FOREIGN PATENT DOCUMENTS

| EP | 249882 A2 | 12/1987 |
|---|---|---|
| EP | 327951 A2 | 8/1989 |
| EP | 969031 A1 | 1/2000 |
| WO | 05866 A1 | 1/2001 |
| WO | 05867 A1 | 1/2001 |

* cited by examiner

*Primary Examiner*—Terressa Boykin
(74) *Attorney, Agent, or Firm*—Andrew J. Caruso; Patrick K. Patnode

(57) ABSTRACT

Polycarbonate compositions incorporating long chain alkylphenol endgroups, for example cardanol, show enhanced pit replication characteristics when molded into optical disks. The enhancement in molding performance is especially pronounced at the shortest mold cycle times tested. Thus, a blend of 75 parts by weight bisphenol A polycarbonate 92 percent encapped with phenol, and 25 parts by weight bisphenol A polycarbonate about 100 percent endcapped with cardanol showed enhanced pit replication performance in optical disk molding trials relative to the same bisphenol A polycarbonate alone and analogous blends utilizing short chain alkylphenols.

29 Claims, No Drawings

METHOD OF ENHANCING PIT REPLICATION IN OPTICAL DISKS

BACKGROUND OF THE INVENTION

This invention relates to a method of enhancing pit replication in the molding of optical disks. More particularly the method relates to chemical modification of polycarbonate endgroups which results in improved molding properties and in particular improved pit replication.

Polycarbonates, especially aromatic polycarbonates, are routinely used in the manufacture of optical disks and are prized for their transparency, toughness, and processability. Bisphenol A polycarbonate is widely used in the fabrication of optical data recording media, including optical disks as exemplified by compact audio disks, CD-ROM disks, and digital versatile disks (DVD).

As data storage densities are increased, physical features of the optical disks are compressed. Thus, as data storage density is increased, features of the disk such as tracks or grooves must be decreased in size in order to accommodate an increased number of these features per unit area of the disk. As the size a physical feature of the disk, for example the tracks, is decreased, the controlled reproduction of this physical feature, referred to generally as pit replication, becomes increasingly difficult. In DVD-R disks, for example, information is encoded in a recordable dye at the bottom of a track which has been molded into a polycarbonate substrate. A laser reading or writing to a DVD-R disk which encounters a defective portion of the track (a portion of the track which does not conform specified track dimensions) will skip to a properly dimensioned portion of the track thereby decreasing the data storage capacity of the disk. This "laser skipping" results in "block error" and a corresponding "block error rate". There is a direct relationship between "percent replication" of a molded-in physical feature such as the disk track and the block error rate. The higher the percent replication value (the closer the pit replication value is to 100 percent) the lower will be the block error rate. Thus, the ability to reproducibly mold a feature such as a disk track of specified dimensions into an optical data storage device such as a DVD-R disk is keenly sought after by commercial manufacturers of optical data storage devices.

Although polycarbonate is widely employed in the manufacture of optical devices such as optical disks, discovery of methods for further improving the utility of polycarbonates by enhancing pit replication in optical disks molded from polycarbonates represents an attractive goal from both technical and commercial perspectives. It is of interest, therefore, to develop methods for enhancing pit replication in the molding of optical disks comprising polycarbonate.

BRIEF SUMMARY OF THE INVENTION

The present invention provides a method for enhancing pit replication in the molding of optical data storage devices comprising polycarbonate. This and further objects of the invention will be more readily appreciated when considering the following disclosure and appended claims.

In one aspect the present invention relates to a method of enhancing pit replication in the molding of optical data storage devices comprising one or more polycarbonates, said method comprising capping at least one of said polycarbonates with end groups having structure I

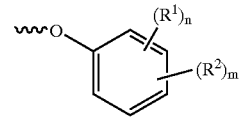

wherein $R^1$ is a $C_{14}$–$C_{30}$ alkyl group, $R^2$ is a $C_1$–$C_{30}$ alkyl group, n is an integer from 1 to 5 and m is an integer from 0 to 4.

In another aspect the present invention provides a method for the enhancement of pit replication in the molding of optical data storage devices comprising two or more constituent polycarbonates by capping at least one of the constituent polycarbonates with endgroups having structure I in a polymerization step or in a post polymerization step.

DETAILED DESCRIPTION OF THE INVENTION

The present invention may be understood more readily by reference to the following detailed description of preferred embodiments of the invention and the examples included herein. In this specification and in the claims which follow, reference will be made to a number of terms which shall be defined to have the following meanings.

The term "polycarbonate" as used herein includes copolycarbonates, homopolycarbonates and (co) polyestercarbonates.

The terms "endcapping agent" and "chainstopping agent" are used interchangeably.

The term "short chain alkylphenol" as used herein refers to an alkylphenol in which the total number of alkyl group carbon atoms attached to the phenolic ring is less than 14. The total number of alkyl group carbon atoms attached to the phenolic ring is referred to as the "carbon count". Short chain alkylphenols are exemplified by p-cresol and o-cresol (carbon count=1); 2,6-dimethylphenol (carbon count=2); 4-octylphenol (carbon count=8); 4-nonylphenol (carbon count=9), 4-dodecylphenol (carbon count=12); 2-methyl-4-decylphenol (carbon count=11); 2,6-dimthehyl-3-undecylphenol (carbon count=13).

The term "long chain alkylphenol" as used herein refers to an alkylphenol in which the total number of alkyl group carbon atoms attached to the phenolic ring is greater than 14. The total number of alkyl group carbon atoms attached to the phenolic ring is referred to as the "carbon count". Long chain alkyl phenols are exemplified by 4-pentdecylphenol and 3-pentadecylphenol (carbon count=15); 2,6-dimethyl-4-tetradecylphenol (carbon count=16); 2,4-dioctylphenol (carbon count=16); and 2,4-dinonylphenol (carbon count= 18).

As used herein the terms 3-pentadecylphenol, meta-pentadecylphenol, and cardanol are used interchangeably.

As used herein the term "pit replication" refers to the process wherein the features of a mold stamper are transferred to a thermoplastic material comprising at least one polycarbonate during the molding of an optical data storage device, such as an optical disk. Thus, the term refers to the replication of molded in features such as grooves or tracks as well as pits, and includes instances in which the feature being molded into the thermoplastic does not include pits. With reference to optical disks, the term pit replication as defined herein encompasses the replication of disk features generally.

As used herein the term "pit replication" encompasses the terms "groove replication" and "track replication" when used in reference to the molding of an optical disk.

As used herein the term "percent replication" is a comparison of the difference in dimensions between the features replicated in a thermoplastic by a stamper during molding, and the physical features of the stamper itself, wherein both the dimensions of the replicated features in the thermoplastic and those of the stamper are determined by Atomic Force Microscopy (AFM). For example, in a molded optical disk comprising polycarbonate one may measure the dimensions of a disk track located 55 mm from the disk center using AFM and compare said dimensions with the corresponding physical feature on the stamper. The measured depth of the molded track is divided by the value of the analogous physical feature on the stamper and is multiplied by 100 to give the percent replication value.

As used herein the terms "percent pit replication" and "percent replication" are used interchangeably.

As used herein the terms "capping" and "endcapping" are used interchangeably.

The present invention provides a method for enhancing pit replication in the molding of optical data storage devices, such as optical disks, comprising one or more polycarbonates, said method comprising a step of capping at least one of the constituent polycarbonates with end groups having structure I. The one or more polycarbonates used in the molding of the optical disks comprise at least one repeat unit corresponding to structure II

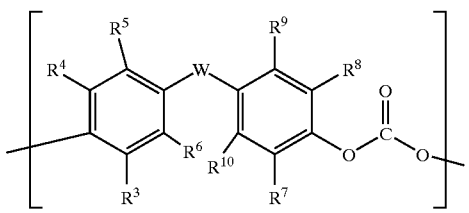

wherein $R^3$–$R^{10}$ are independently a hydrogen atom, halogen atom, nitro group, cyano group, $C_1$–$C_{20}$ alkyl radical $C_4$–$C_{20}$ cycloalkyl radical, or $C_6$–$C_{20}$ aryl radical; W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

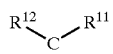

wherein $R^{11}$ and $R^{12}$ are independently a hydrogen atom, $C_1$–$C_{20}$ alkyl radical, $C_4$–$C_{20}$ cycloalkyl radical, or $C_4$–$C_{20}$ aryl radical; or $R^{11}$ and $R^{12}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

Polycarbonates comprising repeat units II may be prepared by polymerizing one or more bisphenols III

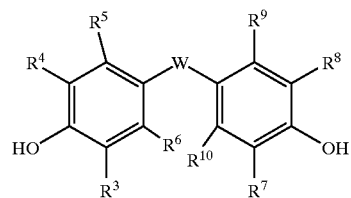

wherein $R^3$–$R^{10}$ and W are defined as in strucutre II, with a source of carbonate units such as phosgene or a diaryl carbonate.

In one embodiment of the present invention at least one polycarbonate comprises repeat units IV, said repeat units being derived from bisphenol A.

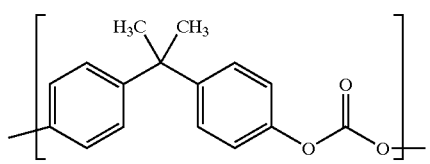

The method of the present invention may be practiced by performing the polycarbonate capping during a polycarbonate polymerization step, or in a post polymerization step. The capping carried out during a polymerization step may be performed under a variety of conditions. In one embodiment of the present invention the capping of the polycarbonate is carried out conveniently in a conventional interfacial reaction of phosgene with at least one bisphenol III, in which a long chain alkylphenol V

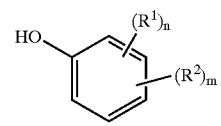

wherein $R^1$ is a $C_{14}$–$C_{30}$ alkyl group, $R^2$ is a $C_1$–$C_{30}$ alkyl group, n is an integer from 1 to 5, and m is an integer from 0 to 4 is employed as a capping agent. The conditions of such reactions are well known in the art; they include the use of a mixture of water and a water-immiscible organic liquid such as methylene chloride as a reaction medium; the presence of a tertiary amine such as triethylamine or dimethylbutylamine, the optional presence of a phase transfer catalyst such as tetrabutylammonium chloride or hexaethylguanidinium chloride; and the presence of a water soluble metal hydroxide such as sodium hydroxide as an acid acceptor. Typical proportions of capping agent are in the range of about 0.1–10 mole percent based on the total amount of bisphenol employed. Suitable bisphenols III include 2,2-bis(4-hydroxyphenyl)propane; 2,2-bis(3-methyl-4-hydroxyphenyl)propane; 1,1-bis(3-methyl-4-hydroxyphenyl)cyclohexane; 1,1-bis(4-hydroxyphenyl) cyclohexane; and 1,1-bis(4-hydroxyphenyl)-3,3,5-trimethylcyclohexane. Suitable long chain alkylphenols V include meta-pentadecylphenol; 4-octadecylphenol, 3-octadecylphenol, 2-octadecylphenol, and mixtures thereof; 2-methyl-3-pentadecylphenol and the like.

In an alternate embodiment of the present invention the capping of the polycarbonate is carried under melt polymerization conditions. The term "melt polymerization conditions" will be understood to mean those conditions necessary to effect reaction between a diaryl carbonate and a dihydroxy aromatic compound to produce a polycarbonate. The reaction temperature is typically in the range of about 100 to about 350° C., more preferably about 180 to about 310° C. and typically a reaction vessel adapted for the removal of volatile by-products is employed. The pressure may be at atmospheric pressure, supraatmospheric pressure, or a range of pressures from atmospheric pressure to about 15 torr in the initial stages of the reaction, and at a reduced pressure at later stages, for example in the range of about 0.001 to about 15 torr. The reaction time is generally about 0.1 hours to about 10 hours.

Typically, where the capping is to be carried out during the melt polymerization of polycarbonate, one or more bisphenols III are reacted with at least one diaryl carbonate in the presence of a melt polymerization catalyst, optionally a co-catalyst, and at least one long chain alkyl phenol V at a temperature in a range between about 100° C. and about 350° C., preferably between about 180° C. and about 310° C., and a pressure in a range between ambient pressure and about 0.001 mmHg. Melt polymerization catalysts which may be employed include alkali metal hydroxides such as sodium hydroxide, or metal salts of polyacids such as ethylenediamine tetraacetic acid magnesium disodium salt, in an amount corresponding to between $1 \times 10^{-8}$ and about $1 \times 10^{-3}$ moles catalyst per total moles of bisphenol employed. The melt polymerization catalyst may further comprise one or more cocatalysts such as a tetraalkylammonium salt or a tetraalkylphophonium salt. Where such cocatalysts are employed, they are typically present in an amount corresponding to between about 1 and about 1000 times the amount of alkali metal hydroxide catalyst employed. Tetraalkylammonium salts suitable for use as cocatalysts include tetramethylammonium hydroxide and tetrabutylammonium hydroxide. Tetraalkylphosphonium salts suitable for use as co-catalysts include tetrabutylphosphonium acetate and tetrabutylphosphonium hydroxide. Suitable bisphenols III include 2,2-bis(4-hydroxyphenyl)propane; 2,2-bis(3-methyl-4-hydroxyphenyl)propane; 1,1-bis(3-methyl-4-hydroxyphenyl)cyclohexane; 1,1-bis(4-hydroxyphenyl)cyclohexane; and 1,1-bis(4-hydroxyphenyl)-3,3,5-trimethylcyclohexane. Suitable long chain alkylphenols V include meta-pentadecylphenol; 4-octadecylphenol, 3-octadecylphenol, 2-octadecylphenol, and mixtures thereof; 2-methyl-3-pentadecylphenol and the like. Suitable diaryl carbonates are illustrated by diphenyl carbonate, dinaphthyl carbonate, bis(2-chlorophenyl) carbonate, bis(ethyl salicyl) carbonate, bis(propyl salicyl) carbonate, bis(phenyl salicyl) carbonate, bis(benzyl salicyl) carbonate, bis(methyl salicyl) carbonate, and the like.

In yet an alternate embodiment of the present invention capping may be carried out on polycarbonate in a post-polymerization step. Typically, polycarbonates which may be capped in a post-polymerization step have number average molecular weights ($M_n$, as measured by gel permeation chromatography using polystyrene molecular weight standards) in a range between about 7,000 and about 25,000 daltons, said polycarbonates having at least about 10 percent, preferably about 20 percent and still more preferably about 50 of the chain terminating groups being hydroxyl groups.

In one embodiment of the present invention a polycarbonate comprising hydroxy terminal groups is treated under "melt polymerization conditions" with a diaryl carbonate in the presence of a long chain alkylphenol V at a temperature in a range between about 100° C. and about 350° C., preferably between about 180° C. and about 310° C. at a pressure between about ambient pressure and about 0.001 mmHg. The employment of a catalyst is optional. Typically, melt polymerization catalysts are effective in promoting post-polymerization capping of polycarbonate. Polycarbonates which may be capped in a post polymerization step include bisphenol A polycarbonate and the like.

In yet another embodiment of the present invention capping may be carried out on polycarbonate in a post-polymerization step wherein a polycarbonate comprising hydroxy terminal groups may be treated under "melt polymerization conditions" with a diaryl carbonate which is itself derived from one or more alkylphenols V, for example bis (4-octadecylphenyl)carbonate, phenyl 4-octadecylcarbonate, or phenyl 3-pentadecyl carbonate. The temperature at which the capping reaction is carried out is in a range between about 100° C. and about 350° C., preferably between about 180° C. and about 310° C. at a pressure between about ambient pressure and about 0.001 mmHg. The employment of a catalyst is optional. Polycarbonates which may be capped under these conditions include bisphenol A polycarbonate and the like.

The method of the present invention provides enhanced "pit replication" in the molding of optical data storage devices comprising polycarbonate. In one embodiment of the present invention the optical data storage device is an optical data storage disk, for example a digital versatile disk (DVD), a recordable digital versatile disk (DVD-R), a DVD-RAM device, a compact disk (CD), a recordable compact disk (CD-R), compact disks with multiple read/write capabilities (CD-R/W) and the like. A typical optical data storage disk such as a DVD-R is comprised of polycarbonate embossed with grooves, sometimes referred to as pits or tracks, on one of its surfaces. These grooves are impressed into the polycarbonate during molding in a step which comprises stamping the polycarbonate at elevated temperature with a stamper, said stamper comprising a series of grooves complimentary to those being embossed upon the disk. The method of the present invention facilitates the reproduction of the stamper surface features, for example grooves. Typically, the features being molded into the disk have dimensions between about 20 and about 250 nanometers, for example an optical data storage disk comprising grooves, said grooves having both depth and width, said depth being between about 20 and about 250 nanometers, and said width being between about 20 and about 250 nanometers.

This fidelity with which a surface feature of a stamper may be molded into the surface of an optical data storage device, such as an optical data storage disk, is reflected in the "percent replication" or "percent pit replication" value. It is desirable that the "percent pit replication value be at least 80 percent, preferably at least 90 percent, and even more preferably greater than 95 percent.

As mentioned in one embodiment of the present invention at least one polycarbonate comprises bisphenol A-derived repeat units IV is capped to provide a "capped polycarbonate" comprising endgroups having structure I. The physical properties of a polycarbonate so constituted will depend on the extent to which the polycarbonate has been capped. Typically, it has been found most advantageous when molding optical data storage disks, such as DVD-R's, to limit the number of endgroups comprising structure I to between about 5 and about 95 percent, preferably between about 5 and about 50 percent, and still more preferably between about 5 and about 30 percent of the endgroups present in the polymer. In the case of polycarbonates comprising structural units other than structure IV the optimum level of endgroups comprising structure I may be greater or less than the "about 5 to about 50 percent" range appropriate for BPA homopolycarbonate which possesses, apart from the chain termini, exclusively repeat units having structure IV.

EXAMPLES

The following examples are set forth to provide those of ordinary skill in the art with a detailed description of how the methods claimed herein are evaluated, and are not intended to limit the scope of what the inventors regard as their invention. Unless indicated otherwise, parts are by weight, temperature is in ° C.

Molecular weights are reported as number average ($M_n$) or weight average ($M_w$) molecular weight and were determined by gel permeation chromatography (GPC) analysis, using polystyrene (PS) and polycarbonate (PC) standards to construct calibration curves against which polymer molecular weights were determined. Molecular weights determined using a calibration curve prepared from polystyrene molecular weight standards are indicated by including "(PS)" after the molecular weight value. Molecular weights determined using a calibration curve prepared from polycarbonate molecular weight standards are indicated by including "(PC)" after the molecular weight value. The temperature of the columns was about 25° C. and the mobile phase was chloroform. Terminal OH endgroup concentrations were measured by quantitative infrared spectroscopy. "Overall endcapping levels" were determined by $^1$H-NMR. The overall endcapping level refers to the percentage of polymer chain ends which are not terminated by OH groups. An overall endcapping level of 96 percent means that 96 percent of the polymer chain ends are terminated by groups other than OH.

Polycarbonate Endcapping

Four methods were employed to "endcap" polycarbonate and detailed examples of each of these methods is provided here.

Method 1: Polycarbonate Endcapping During Interfacial Polymerization

Example 1

A 500 mL Morton flask was charged with bisphenol A (BPA, 22.8 g, 100.0 mmol), meta-pentadecylphenol (1.83 g, 6.0 mmol, 6.0 mol %), methylene chloride (90 mL), distilled water (90 mL) and triethylamine (TEA, 200 microliters (μl), 1.4 mol %). The pH was adjusted to 10.5 with 50 wt % aqueous NaOH and 13.3 g (133 mmol, 30 mol % excess) of phosgene was added at 0.60 g/min maintaining the pH at 10.5. The polymer solution was separated from the brine and washed once with 1N HCl and four times with distilled water. The polymer was isolated by precipitation into hot water, filtered and dried at 110° C. in a vacuum oven overnight. The precipitated polycarbonate had a Tg=116° C., Mw (PS)=32,900, and 5.32 mol % (based on moles of bisphenol A repeat units present) meta-pentadecylphenyl endgroups as determined by proton nuclear magnetic resonance spectroscopy ($^1$H-NMR).

Example 2

A 500 mL Morton flask was charged with BPA (22.8 g, 100.0 mmol), meta-pentadecylphenol (0.61 g, 2.0 mmol, 2.0 mol %), p-cumlyphenol (PCP, 0.85 g, 4.0 mmol, 4.0 mol %), methylene chloride (90 mL), distilled water (90 mL) and TEA (200 μl, 1.4 mol %). The pH was adjusted to 10.5 with 50 wt % aqueous NaOH and 13.3 g (133 mmol, 30 mol % excess) of phosgene was added at 0.60 g/min maintaining the pH at 10.5. The polymer solution was separated from the brine and washed once with 1N HCl and four times with distilled water. The polymer was isolated by precipitation into hot water, filtered and dried at 110° C. in a vacuum oven overnight. The precipitated polycarbonate had a Tg=133°, Mw (PS)=32,900, and 1.8 mol % (based on moles of bisphenol A repeat units present) meta-pentadecylphenyl endgroups as determined by $^1$H-NMR.

Method 2: Polycarbonate Endcapping During Melt Polymerization Using bis(methyl salicyl carbonate (BMSC)

Example 3

The melt polymerization reaction was run in a 100 mL glass reactor adapted for distillation under vacuum equipped with a solid nickel helical agitator. The reactor was configured such that by-product phenol or methyl salicylate could be distilled out of the reaction vessel and condensed in a chilled receiving vessel. The reactor was charged at ambient temperature and pressure with bisphenol A (General Electric Plastics Japan Ltd., 0.4380 mol), bis(methyl salicyl) carbonate (0.4519 mol), and meta-pentadecylphenol chainstopper (0.0277 mol). Catalyst (ethylene diamine tetraaceticacid magnesium disodium salt, 4.4×10$^{-4}$ mmol) and co-catalyst (tetrabutyl phosphonium acetate, 0.11 mmol) were added as solutions in deionized water into the bisphenol A layer and the reactor assembled. The reactor was then evacuated briefly and nitrogen was reintroduced. This step was repeated three times. The reactor was then lowered into the sand bath maintained at 180° C. After a five minute period stirring at 250 rpm was initiated. After a total of 10 minutes the reaction mixture had fully melted. The temperature of the bath was raised to 210° C. over a five-minute period. The pressure in the reactor was then reduced to 180 mmHg at which point the phenolic by-product began to distill from the reaction vessel into the receiving vessel. The reaction mixture was held at 210° C. and 180 mmHg for 20 minutes. The temperature was raised to 240° C. over a five-minute period. The pressure was then lowered to 10 mmHg and the reaction mixture was stirred at 240° C. at 10 mmHg for 20 minutes. The temperature was then raised to 270° C. over a five-minute period and the pressure was then lowered to <1 mmHg. The reaction mixture was stirred at 270° C. at <1 mmHg for 60 minutes after which the reaction vessel was raised from the sand bath and the molten product polymer was scooped from the reaction vessel into a liquid nitrogen bath in order to quench the reaction. The product polycarbonate had a Tg=115° C., Mw (PS)=26464, Mw (PC)=15810, 5.38 mol % meta-pentadecylphenyl endgroups, and 274 ppm free OH endgroups.

Example 4

A melt polymerization reactor equipped as in Example 3 was charged at ambient temperature and pressure with bisphenol A (0.4380 mol), bis(methyl salicyl) carbonate (0.4519 mol), and octadecylphenol chainstopper (0.0277 mol). Catalyst (ethylene diamine tetraaceticacid magnesium disodium salt, 4.4×10$^{-4}$ mmol) and co-catalyst (tetrabutyl phosphonium acetate, 0.11 mmol) were added as solutions in deionized water into the bisphenol A layer and the reactor assembled. The reactor was then evacuated briefly and nitrogen was reintroduced. This step was repeated three times. The reactor was then lowered into the sand bath maintained at 180° C. After a five minute period stirring at 250 rpm was initiated. After a total of 10 minutes the reaction mixture had fully melted. The temperature of the bath was raised to 210° C. over a five-minute period. The pressure in the reactor was then reduced to 180 mmHg at which point the phenolic by-product began to distill from the reaction vessel into the receiving vessel. The reaction mixture was held at 210° C. and 180 mmHg for 20 minutes. The temperature was raised to 240° C. over a five-minute period. The pressure was then lowered to 10 mmHg and the reaction mixture was stirred at 240° C. at 10 mmHg for 20 minutes. The temperature was then raised to 270° C. over a five-minute period and the pressure was then lowered to <1 mmHg. The reaction mixture was stirred at 270° C. at <1 mmHg for 60 minutes after which the reaction vessel was raised from the sand bath and the molten product polymer was scooped from the reaction vessel into a liquid nitrogen bath in order to quench the reaction. The product polycarbonate had a Tg=114° C., Mw (PS)=25904, Mw (PC)=15476, 6.63 mol % octadecylphenyl endgroups, and 502 ppm free OH endgroups.

Method 3: Post-olymerization Polycarbonate Endcapping

Example 5

To a hot cylindrical stainless seal reactor equipped with an overhead stirrer, gas inlet and vacuum outlet which had been preheated in an oven to a temperature of 180° C. was charged bisphenol A polycarbonate homopolymer (31 g, Mw (PS)=30598, Mn (PS)=14145) 81 percent of the endgroups of which were phenoxy endgroups, bis(methyl salicyl)carbonate (0.49 g, 1.45 mmol), and meta-pentadecylphenol (0.442 g, 1.45 mmol). No catalyst was added. The reactor was purged with argon gas and the temperature of the reaction mixture was equilibrated to 300° C. The reaction mixture was stirred at 10 rpm for 1 minute under argon. A vacuum was applied to the reactor and the stirring rate was increased to 80 rpm. The reaction mixture was heated at 300° C. and reduced pressure for a 20 minute period. During this period the pressure in the reactor was gradually reduced to between about 0.5 and 2 mTorr. At this point, argon gas was cautiously reintroduced into the reactor and the molten polycarbonate was poured from the reactor and allowed to cool. The cooled product was dissolved in methylene chloride and precipitated by adding the methylene chloride solution to approximately 4 volumes of methanol while stirring vigorously to yield a white powder which was found to have Mw (PS)=27619, Tg=137° C., 1.46 mol % meta-pentadecylphenyl endgroup, and overall endcapping level of 96 percent as determined by $^1$H-NMR.

Example 6

To a reactor equipped and operated as in Example 5 was charged BPA homopolycarbonate (31 g, Mw=30598, Mn=14145, 81% end-capped), bis(methyl salicyl)carbonate (0.49 g, 1.45 mmol), and bis(meta-pentadecyl-phenyl) carbonate (0.46 g, 1.45 mmol). No catalysts were added. The experimental procedure employed in Example 5 was followed to yield product endcapped polycarbonate as a white powder which had Mw (PS)=28509, Tg=138° C., 0.90 mol % meta-pentadecylphenyl endgroups, and an overall endcapping level of 92 percent.

Example 7

To a reactor equipped and operated as in Example 5 was charged BPA homopolycarbonate (31 g, Mw=30598, Mn=14145, 81% end-capped), bis(methyl salicyl)carbonate (0.49 g, 1.45 mmol), and octadecylphenol (0.50 g, 1.45 mmol). No basic catalysts was added. The experimental procedure employed in Example 5 was followed to yield product endcapped polycarbonate as a white powder which had Mw (PS)=30657, Tg=139° C., 0.72 mol % meta-pentadecylphenyl endgroups, and an overall endcapping level of 89 percent.

Method 4: Polycarbonate Endcapping During Melt Polymerization Using Diphenyl Carbonate (DPC)

Example 8

A cylindrical glass reactor equipped as in Example 5 was charged with diphenyl carbonate (DPC, 284.842 g, 1.33 mol), BPA (256.032 g, 1.22 mol), and meta-pentadecylphenol (13.661 g, 0.045 mol). Sodium hydroxide (1555 μl of 0.001 M aqueous. NaOH solution) and tetramethylammonium hydroxide (295 μl of 1.0 M aqueous solution) were added as catalyst and co-catalyst respectively. The reactor was sealed, purged with nitrogen gas and heated over the course of a 285 minute period to 300° C. while the pressure over the reaction mixture was lowered to 0.5 mmHg. The reactor was then brought to atmospheric pressure by the introduction of nitrogen gas and the product polycarbonate was poured from the reactor and allowed to cool. Reprecipitation of this polycarbonate according to the method described in Example 5 afforded the product polycarbonate as a white powder which was found to have Mw (PS)=16184, Tg=120° C., 0.43 mol % meta-pentadecylphenyl endgroups and an overall endcapping level of 94%.

Example 9

A cylindrical glass reactor equipped as in Example 5 was charged with DPC (41.464 g, 0.194 mol), bis(meta-pentadecylphenyl)carbonate (1.217 g, 0.002 mol), and BPA (43.750 g, 0.192 mol). Catalysts, sodium hydroxide (194 μl, 0.001 M aq. NaOH) and tetramethylammonium hydroxide (TMAH, 48 μl, 1.0 M aqueous TMAH) were added and the reactor was purged with nitrogen. Over the course of 260 minute period the temperature of the reaction mixture was raised to 300° C. while the pressure over the reaction mixture was lowered 2 mmHg. The reactor was then brought to atmospheric pressure by the introduction of nitrogen gas and the product polycarbonate was poured from the reactor and allowed to cool. Reprecipitation of this polycarbonate according to the method described in Example 5 afforded the product polycarbonate as a white powder which was found to have Mw (PS)=24976, Tg=138° C., 0.048 mol % meta-pentadecylphenyl endgroups and an overall endcapping level of 94%.

General Procedure for the Preparation of Alkylphenol Endcapped Polycarbonates

A 200 L glass-lined reactor was charged with BPA (11400 g, 50 mol), alkylphenol endcapper (6 mol), methylene chloride (42 L), distilled water (42 L) and TEA (97 mL, 1.5 mol %). The pH was adjusted to 10.5 with NaOH (8000 g) and phosgene was added at 125 g/min for 40 minutes to maintain a 10.5 pH. Then, the phosgenation rate was slowed to 100 g/min for an additional 15 minutes while NaOH (12800 g) was added such that a 10.5 pH was maintained. At the end of the reaction, the pH was adjusted to 9–9.5 by metering in excess phosgene. The polymer solution was diluted with methylene chloride (35 L), separated from the brine, washed two times with 1N HCl and six times with distilled water. The polymer was isolated by steam precipitation and dried overnight at 120° C. under nitrogen. The following samples were prepared using this procedure:

Comparative Example 1: 100% para-nonylphenol capped homopolycarbonate Tg=139 C, Mw=33988, Mn=13630
Comparative Example 2: 100% para-dodecylphenol capped homopolycarbonate Tg=136 C, Mw=32973, Mn=13456
Example 10: 100% meta-pentadecylphneol capped homopolycarbonate Tg=118 C, Mw=32683, Mn=10817

Blends for Optical Disk Molding

The polycarbonates of Comparative Examples 1 and 2 and Example 10 were blended in an extruder under standard melt processing conditions with bisphenol A polycarbonate (Tg=143° C., Mw (PS)=32379, Mn (PS)=15516) having about 8 percent hydroxy chain terminal groups to afford blend samples; Comparative Example 3, Comparative Example 4 and Example 11. Extruder conditions employed are given below. Additives introduced during the extrusion of

| Extruder | Value | Unit |
| --- | --- | --- |
| Intake | 32 | *C |
| Zone 1 | 199 | *C |
| Zone 2 | 257 | *C |
| Zone 3 | 256 | *C |
| Zone 4 | 256 | *C |
| Zone 5 | 259 | *C |
| Zone 6 | 261 | *C |
| Zone 7 | 260 | *C |
| Speed | 298 | rpm |
| Feeder 1 | 25 | % |
| Feeder 2 | 75 | % |
| Vacuum | 0.6–0.8 | bar |
| Throughput | 26 | Kg/hr |
| Torque ave. | 56 | % | each of Comparative Examples 3–4 and Example 11 to arrive at a final concentration of 100 ppm of a stabilizer (IRGAPHOS) and 200 ppm of a mold release agent, gycerol monostearate (GMS). The blended resin was pelletized to produce transparent, colorless pellets. The blends were found to have the following characteristics:

Comparative Example 3(Blend of Comparative Example 1 (para-nonylphenol capped) with bisphenol A polycarbonate (25:75 wt/wt)): Tg=142 C, Mw=31515, Mn=12929.
Comparative Example 4 (Blend of Comparative Example 2(para-dodecylphenol capped) with bisphenol A polycarbonate (25:75 wt/wt)): Tg=141 C, Mw=31748, Mn=12905.
Example 11 (Blend of Example 10 (meta-pentadecylphneol capped) with bisphenol A polycarbonate (25:75 wt/wt)): Tg=136 C, Mw=31622, Mn=12065.

Optical Disk Molding and Pit Replication Measurement

Physical data for the polycarbonate blends of Example 11 and Comparative Examples 3 and 4, and for bisphenol A homopolycarbonate (Comparative Example 5) provided in Table I. The column heading "Endcap" refers to the alkylphenol endcapping agent employed in the preparation of the referenced polycarbonate blend. In Comparative Example 5 no alkylphenol endcapping agent was employed. The bisphenol A polycarbonate of Comparative Example 5 is about 92 percent endcapped with phenol. That is, about 92 percent of the polymer chain ends terminate in a phenoxy group, the reminder in OH groups. The column heading "% Endcap" refers to the approximate number of polycarbonate chain terminal groups which are derived from either a long chain alkyl phenol or a short chain alkyl phenol. The column heading "Tg" refers to the glass transition temperature of the referenced polycarbonate blend (or in the case of Comparative Example 5 the reference homopolycarbonate) and is given in degrees centigrade (° C.). Values for weight average molecular weight ($M_w$), number average molecular weight ($M_n$), and dispersivity ($M_w/M_n$) were determined by gel permeation chromatography using polystyrene (PS) standards.

TABLE I

Physical Data for Polycarbonate Blends and Comparative Example 5

| Sample | Endcap | % Endcap | Tg | $M_w$ | $M_n$ | $M_w/M_n$ |
| --- | --- | --- | --- | --- | --- | --- |
| Comparative Example-3 | Nonyl phenol | 25 | 146 | 31515 | 12929 | 2.438 |
| Comparative Example-4 | Dodecyl phenol | 25 | 141 | 31748 | 12905 | 2.460 |
| Example 11 | Cardanol | 25 | 136 | 31622 | 12065 | 2.621 |
| Comparative Example-5 | — | — | 143 | 32379 | 15516 | 2.087 |

Example 11, Comparative Examples 3 and 4, and Comparative Example 5 were each molded into 120 millimeter (mm) optical disks on a Sumitomo Heavy Industries SD30 molding machine operated at 295° C. to 385° C., clamping at 18 tons, stationary side mold temperatures from 117 to 121° C., moving side mold temperatures from 114 to 118° C., and 6 to 9 second cycle-times (3 to 6 second cool-times). The disks were molded under four sets of conditions referred to in Table II as Molding Conditions 1–4. Mold cycle times for Molding Conditions 1–4 were 9, 6, 9, and 6 seconds respectively.

TABLE II

Disk Molding Conditions

| Material | Molding Condition | Stationary Side Mold Temperature | Moving Side Mold Temperature | Cooling Time |
| --- | --- | --- | --- | --- |
| Comparative Example-3 | 1 | 121 | 118 | 6 |
| Comparative Example-3 | 2 | 121 | 118 | 3 |
| Comparative Example-3 | 3 | 117 | 114 | 6 |
| Comparative Example-3 | 4 | 117 | 114 | 4 |
| Comparative Example-4 | 1 | 121 | 118 | 6 |
| Comparative Example-4 | 2 | 121 | 118 | 3 |
| Comparative Example-4 | 3 | 117 | 114 | 6 |
| Comparative Example-4 | 4 | 117 | 114 | 4 |
| Example 11 | 1 | 121 | 118 | 6 |
| Example 11 | 2 | 121 | 118 | 3 |
| Example 11 | 3 | 117 | 114 | 6 |
| Example 11 | 4 | 117 | 114 | 4 |
| CE-5 | 1 | 121 | 118 | 6 |
| CE-5 | 2 | 121 | 118 | 3 |
| CE-5 | 3 | 117 | 114 | 6 |
| CE-5 | 4 | 117 | 114 | 4 |

Pit replication data for the polycarbonates of Comparative Examples 3 and 4, and Example 11, and Comparative Example 5, molded under Molding Conditions 1–4 are gathered in Table III below. The data show clearly that enhanced pit replication is observed for the compositions comprising polycarbonate endcapped with a alkylphenol having a "carbon count" of greater than 14.

TABLE III

Pit Replication Results

| Material | Molding Conditions | Percent Replication 55 mm Radius |
|---|---|---|
| Comparative Example-3 | 1 | 53.3 |
| Comparative Example-3 | 2 | 88.4 |
| Comparative Example-3 | 3 | 52.0 |
| Comparative Example-3 | 4 | 74.5 |
| Comparative Example-4 | 1 | — |
| Comparative Example-4 | 2 | — |
| Comparative Example-4 | 3 | 71.3 |
| Comparative Example-4 | 4 | 77.3 |
| Example 11 | 1 | 90.1 |
| Example 11 | 2 | 95.0 |
| Example 11 | 3 | 70.7 |
| Example 11 | 4 | 98.0 |
| Comparative Example-5 | 1 | 58.3 |
| Comparative Example-5 | 2 | 89.1 |
| Comparative Example-5 | 3 | 44.8 |
| Comparative Example-5 | 4 | 54.2 |

The data given in Table III clearly demonstrate the beneficial effect on pit replication of capping polycarbonate according to the method of the present invention. Thus, Example 11 shows in all but one instance (Comparative Example 4 under molding conditions 4) superior pit replication when compared to Comparative Examples 3 and 4, in which one of the polycarbonates constituting the blend has been capped with an alkylphenol falling outside the scope of the present invention. Comparative Example 5 illustrates the superiority of the method of the present invention compared to pit replication observed when molding optical disks using commercially available bisphenol A polycarbonate homopolymer. Surprisingly, the observed enhancement in pit replication due to cardanol endcapping is most pronounced at the shortest cycle times tested (Molding condition 4). Such a finding holds promise in that it should enable greater productivity in the molding optical articles such as optical disks.

The invention has been described in detail with particular reference to preferred embodiments thereof, but it will be understood by those skilled in the art that variations and modifications can be effected within the spirit and scope of the invention.

What is claimed is:

1. A method of enhancing pit replication in the molding of optical data storage devices comprising one or more polycarbonates, said method comprising capping at least one of said polycarbonates with end groups having structure I

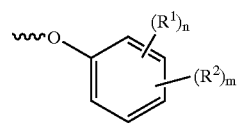

I wherein $R^1$ is a $C_{14}$–$C_{30}$ alkyl group, $R^2$ is a $C_1$–$C_{30}$ alkyl group, n is an integer from 1 to 5 and m is an integer from 0 to 4.

2. A method according to claim 1 wherein at least one of said polycarbonates comprises repeat units II

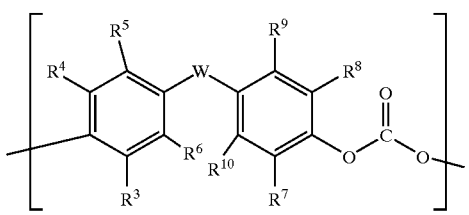

II wherein $R^3$–$R^{10}$ are independently a hydrogen atom, halogen atom, nitro group, cyano group, $C_1$–$C_{20}$ alkyl radical $C_4$–$C_{20}$ cycloalkyl radical, or $C_6$–$C_{20}$ aryl radical; W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

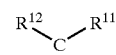

wherein $R^{11}$ and $R^{12}$ are independently a hydrogen atom, $C_1$–$C_{20}$ alkyl radical, $C_4$–$C_{20}$ cycloalkyl radical, or $C_4$–$C_{20}$ aryl radical; or $R^{11}$ and $R^{12}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

3. A method according to claim 1 wherein at least one of said polycarbonates comprises repeat units having structure IV

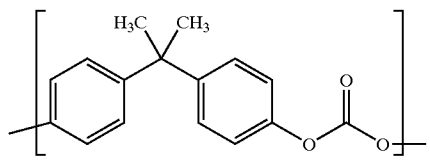

III

4. A method according to claim 1 wherein said capping is effected during a polymerization step.

5. A method according to claim 4 wherein said polymerization step is an interfacial polymerization step.

6. A method according to claim 4 where said polymerization step is a melt polymerization step.

7. A method according to claim 6 wherein said melt polymerization step comprises heating at a temperature in a range between about 100° C. and 350° C. at least one dihydroxy aromatic compound, at least one diaryl carbonate, at least one melt polymerization catalyst and at least one alkylphenol having structure V

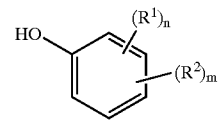

V wherein $R^1$ is a $C_{14}$–$C_{30}$ alkyl group, $R^2$ is a $C_1$–$C_{30}$ alkyl group, n is an integer from 1 to 5, and m is an integer from 0 to 4.

8. A method according to claim 7 wherein said alkylphenol is m-pentadecylphenol.

9. A method according to claim 7 wherein said diaryl carbonate is selected from the group consisting of diphenyl carbonate, bis(2-chlorophenyl)carbonate, bis(ethyl salicyl)

carbonate, bis(propyl salicyl)carbonate, bis(phenyl salicyl) carbonate, bis(benzyl salicyl)carbonate, and bis(methyl salicyl)carbonate.

10. A method according to claim 7 wherein said bisphenol is selected from the group consisting of 2,2-bis(4-hydroxyphenyl)propane; 2,2-bis(3-methyl-4-hydroxyphenyl)propane; 1,1-bis(3-methyl-4-hydroxyphenyl)cyclohexane; 1,1-bis(4-hydroxyphenyl) cyclohexane; and 1,1-bis(4-hydroxyphenyl)-3,3,5-trimethylcyclohexane.

11. A method according to claim 7 wherein said catalyst comprises an alkali metal hydroxide in an amount corresponding to between about $1 \times 10^{-8}$ and $1 \times 10^{-3}$ moles of alkali metal hydroxide per mole bisphenol employed.

12. A method according to claim 11 wherein the catalyst further comprises a cocatalyst selected from the group consisting of tetraalkyl ammonium salts, tetraalkylphosphonium salts and mixtures thereof.

13. A method according to claim 1 wherein said capping is effected in a post polymerization step.

14. A method according to claim 13 wherein said capping is carried out on a polycarbonate having a number average molecular weight ($M_n$) in a range between about 7,000 and about 25,000 daltons, said polycarbonate having at least 10 percent of the chain terminating groups being hydroxyl groups.

15. A method according to claim 14 wherein said polycarbonate is heated under melt polymerization conditions together with at least one diaryl carbonate and at least one long chain alkylphenol having structure V

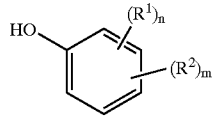

V wherein $R^1$ is a $C_{14}$–$C_{30}$ alkyl group, $R^2$ is a $C_1$–$C_{30}$ alkyl group, n is an integer from 1 to 5, and m is an integer from 0 to 4.

16. A method according to claim 15 wherein said alkylphenol is m-pentadecylphenol.

17. A method according to claim 1 wherein said optical data storage device is an optical data storage disk comprising grooves.

18. A method according to claim 17 wherein said groves have dimensions in a range between about 20 and about 250 nanometers.

19. A method according to claim 18 wherein said optical data storage disk has a percent pit replication value of at least 80 percent.

20. A method of enhancing pit replication in the molding of optical data storage disk comprising bisphenol A polycarbonate, said method comprising capping said bisphenol A polycarbonate with end groups having structure I

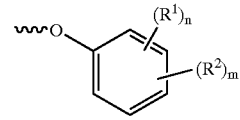

I wherein $R^1$ is a $C_{14}$–$C_{30}$ alkyl group, $R^2$ is a $C_1$–$C_{30}$ alkyl group, n is an integer from 1 to 5 and m is an integer from 0 to 4.

21. A method according to claim 20 wherein said optical data storage disk is a recordable digital versatile disk comprising grooves.

22. A method according to claim 21 wherein said grooves have dimensions in a range between about 20 and about 250 nanometers.

23. A method according to claim 22 wherein said recordable digital versatile disk has a pit replication value of at least 80 percent.

24. A method according to claim 20 wherein said capping is carried out under conditions which produce a bisphenol A polycarbonate in which between 5 and 50 percent of the endgroups comprise structure I.

25. A method according to claim 20 wherein said capping is effected in a polymerization step.

26. A method according to claim 25 wherein said polymerization step is an interfacial polymerization step.

27. A method according to claim 25 wherein said polymerization step is a melt polymerization step.

28. A method according to claim 20 wherein said capping is carried out in a post-polymerization step.

29. A molded recordable digital versatile disk comprising polycarbonate, said polycarbonate comprising end groups having structure I

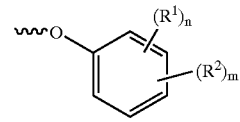

I wherein $R^1$ is a $C_{14}$–$C_{30}$ alkyl group, $R^2$ is a $C_1$–$C_{30}$ alkyl group, n is an integer from 1 to 5 and m is an integer from 0 to 4.

* * * * *